April 1, 1941.  J. L. SMITH  2,237,238
GRASS SHEARS
Filed May 3, 1939  2 Sheets-Sheet 1
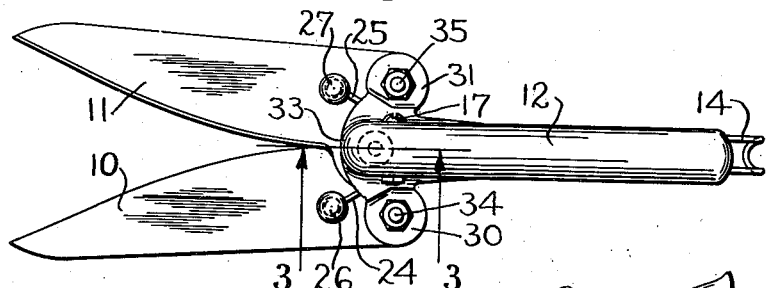
Fig.1.
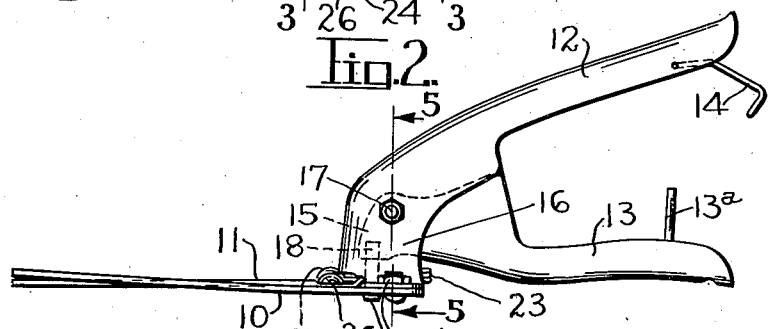
Fig.2.
Fig.3.  Fig.4.
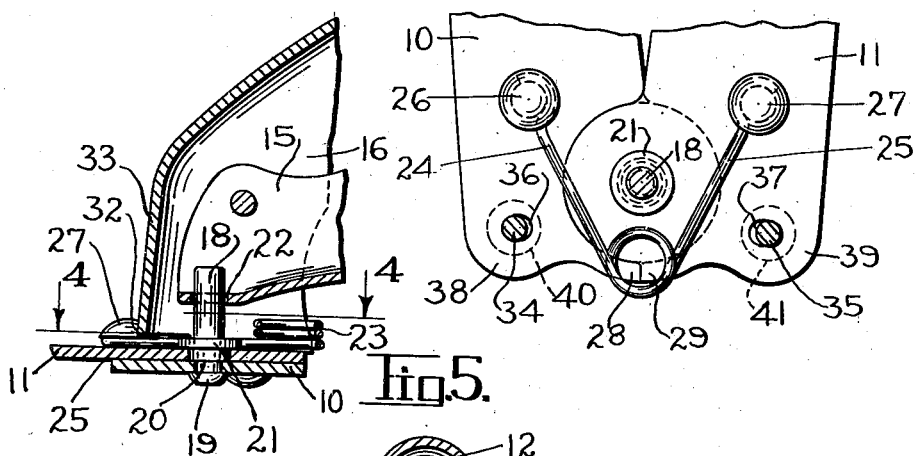
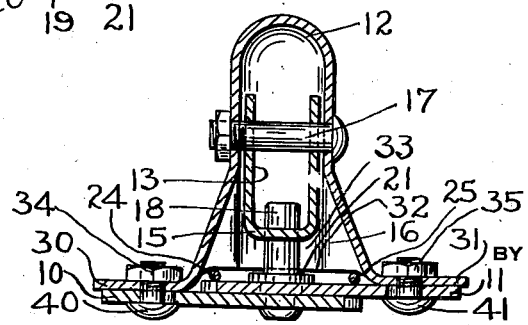
Fig.5.
INVENTOR
Justin L. Smith.
BY H. G. Manning
ATTORNEY April 1, 1941.                    J. L. SMITH                    2,237,238
                                 GRASS SHEARS
                             Filed May 3, 1939                2 Sheets-Sheet 2
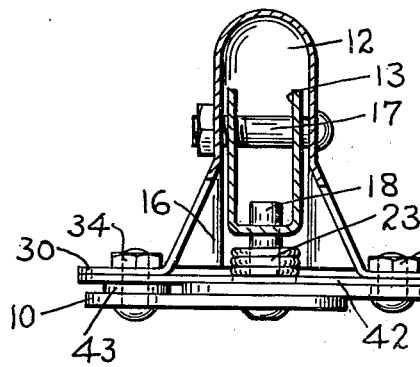
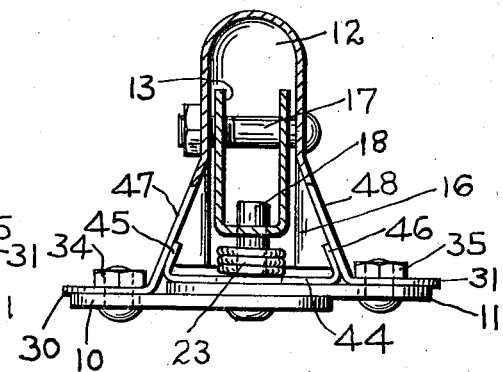
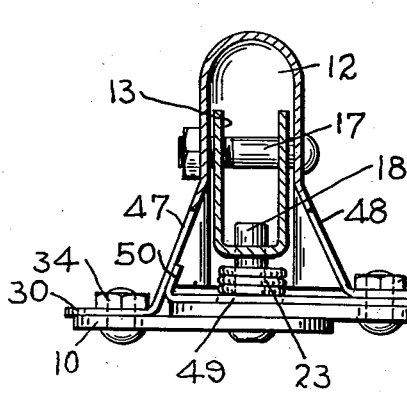
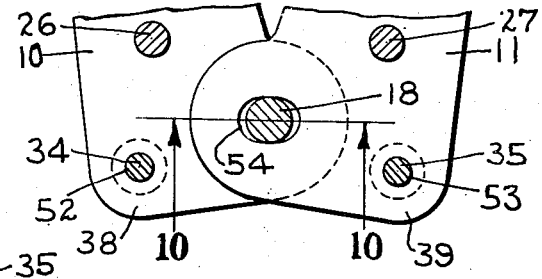
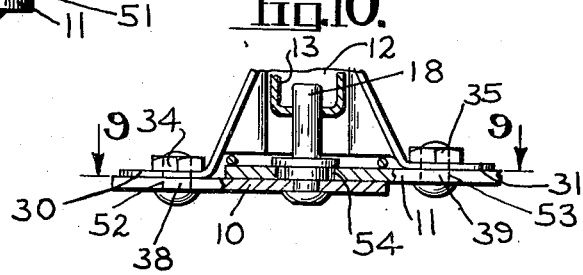
INVENTOR
*Justin L. Smith.*
BY
*H. G. Manning*
ATTORNEY Patented Apr. 1, 1941

2,237,238

UNITED STATES PATENT OFFICE 2,237,238

GRASS SHEARS

Justin L. Smith, Watertown, Conn., assignor to Seymour Smith & Son, Inc., Oakville, Conn., a corporation of Connecticut Application May 3, 1939, Serial No. 271,544

6 Claims. (Cl. 30—244)

This invention relates to garden implements, and more particularly to improvements in shears adapted for use in trimming grass, shrubs, and the like.

One object of this invention is to provide a pair of grass shears of the type where the blades operate in a horizontal plane and the blade-actuating handles swing in a vertical plane.

A further object of this invention is to provide improved shears of the above nature which will be relatively inexpensive to manufacture, simple in construction, compact, ornamental in appearance, and very efficient and durable in use.

With these and other objects in view, which will appear as the description proceeds, there have been illustrated in the accompanying drawings several forms in which the invention may be conveniently embodied in practice.

In the drawings:

Fig. 1 is a top plan view of a pair of grass shears embodying the features and principles of this invention.

Fig. 2 is a side view of the same.

Fig. 3 is an enlarged broken sectional view taken on the line 3—3 of Fig. 1.

Fig. 4 is an enlarged broken sectional view taken on the line 4—4 of Fig. 3.

Fig. 5 is an enlarged broken sectional view taken on the line 5—5 of Fig. 2.

Fig. 6 is an enlarged rear sectional view showing a modified form of grass shears having a brace strip to reinforce the upper handle member.

Figs. 7 and 8 are enlarged rear sectional views showing grass shears having two modified forms of handle reinforcing members.

Fig. 9 is an enlarged sectional view of still another modified form of grass cutting shears, taken on the line 9—9 of Fig. 10.

Fig. 10 is a broken sectional view taken on the line 10—10 of Fig. 9.

Referring now to the drawings wherein like reference characters designate corresponding parts throughout the several views, the numerals 10 and 11 denote a pair of shear blades arranged to swing in a horizontal plane, and the numerals 12 and 13 denote blade-actuating nested handles arranged to swing in a vertical plane. A pin 13a extends upwardly from the rear of the lower handle 13 toward the upper handle 12 to limit the closing movements thereof, and a wire hook 14 is pivoted to the rear of the upper handle 12 for resiliently catching over the outer end of the lower handle 13 when it is desired to detachably lock said handles in closed position. The handles 12 and 13 are preferably formed from sheet metal into U-shaped cross-section, and the forward end 15 of the lower handle 13 is adapted to be embraced between the legs at the forward end 16 of the upper handle 12,—said handles being pivoted together by a horizontal bolt 17 which passes through both of said forward sections.

The shear blades 10 and 11 are pivoted together by a vertical spindle 18 which is fixedly secured to the lower blade 10 by having its lower end 19 headed over or riveted thereon to rigidly clamp said lower blade 10 against a circular shoulder 20 which fits freely within a circular aperture formed in the upper blade 11. A collar 21 is formed on the spindle 18 above said shoulder 20 and serves to prevent the blades 10 and 11 from springing apart in the normal operation of the shears. From the collar 21, the spindle 18 extends upwardly and passes loosely through a circular opening 22 provided in the front end 15 of the lower handle 13.

In order to urge the blades 10 and 11 toward the open position shown in Fig. 1, provision is made of a coiled spring 23, having diverging forward ends 24 and 25 extended forwardly over the blades 10 and 11 respectively, and having curved extremities engaged under a pair of headed studs 26 and 27 respectively. Co-operating tongues 28 and 29 are preferably formed on the rear ends of the blades 10 and 11 respectively to limit the automatic opening movements of the blades by the action of the spring 23.

The upper channel-shaped handle 12 extends forwardly and downwardly over the spindle 18 to a point closely adjacent the blades 10 and 11, and has a pair of flat side feet 30 and 31 which laterally engage said blades behind the spindle 18. As herein shown, the foot 30 is arranged to seat upon the lower blade 10 and the foot 31 is arranged to seat upon the upper blade 11. Also the lower forward edge 32 of the upper handle 12 is spaced slightly from the blades 10 and 11 to permit the inclined ends 24 and 25 of the spring 23 to extend forwardly thereunder. The front of the upper handle 12 is closed at its lower end 33 adjacent the blades 10 and 11 to form a rigid connection between the side feet 30 and 31, and thereby resist forces which tend to spring apart said feet laterally during the normal operation of the shear.

The horizontal portions of the feet 30 and 31 are pivoted to the blades 10 and 11 respectively by a pair of headed bolts or pins 34 and 35 which fit tightly in said feet 30 and 31, and have loose sliding fits in a pair of transverse short slots 36 and 37 formed in the blades 10 and 11 respectively (see Fig. 4). The arrangement is such that when the blades 11 and 10 are being closed, the rear end portions 28 and 29 of the blades 10 and 11 are adapted to slide outwardly between the horizontal portions of the feet 30 and 31 and the heads 40 and 41 of the pivot bolts 34 and 35 respectively, which are located under said blades.

In the modified form of shear shown in Fig. 6, a reinforcing metal plate is provided which has its respective ends disposed between the feet 30 and 31 and the blades 10 and 11—a spacing washer 43 being provided beneath the foot 30. The center of the reinforcing plate 42 is engaged by the spring 23, and may be spot-welded at its ends to said feet if desired.

In the modification shown in Fig. 7, provision is made of a U-shaped reinforcing strip of metal 44 having upturned inwardly-inclined arms 45 and 46, which are spot-welded to the flared sides 47 and 48 of the front end 16 of the upper handle 12.

Fig. 8 illustrates a modification in which an L-shaped reinforcing strip 49 is used in place of the U-shaped strip 44. The L-shaped strip 49 has a single inclined upturned arm 50 which is spot-welded to the flared end 16 of the handle, and the flat end 51 of said strip is disposed beneath the foot 31 and secured thereto by the pivot bolt 35. As in the previously described form, shown in Fig. 6, the flat end 51 may be spot-welded to the foot 31 if desired.

In the modified form shown in Figs. 9 and 10, the vertical side pivot bolts 34 and 35 fit snugly in a pair of circular openings 52 and 53 formed in the rear end portions 38 and 39 of the blades 10 and 11 respectively, and serve to tightly clamp the feet 30 and 31 thereto. In this form, a short transverse slot 54 is provided in the upper blade 11 through which the center pivot spindle 18 extends to permit lateral sliding of this blade with respect to the lower blade 10 when the shears are operated. As in the first form of the invention shown in Figs. 1 to 5 inclusive, the upper blade 11 is freely rotatable on the spindle 18, while the blade 10 is rigidly clamped thereto—this construction preventing tilting of said spindle.

*Operation*

In operation, when the resilient hook 14 is released from the end of the handle 13, the blades 10 and 11 and the handles 12 and 13 will be automatically forced apart to open position by the spring 23. The handles will then be grasped in the hand of the user, and while held in a vertical plane, will be pressed together to close the blades 10 and 11 and sever the grass or other material located therebetween. During this operation the forward end 15 of the lower handle 13 pulls upon the spindle 18 and slides it rearwardly, causing the blades 10 and 11 to be swung upon the spindle 18 to closed position. During this operation the rear ends 28 and 29 of the blades will be forced apart and caused to slide laterally between the confining surfaces of the feet 30 and 31 and the bolt heads 40 and 41.

While there have been disclosed in this specification several forms in which the invention may be conveniently embodied, it is to be understood that these forms are shown for the purpose of illustration only, and that the invention is not to be limited to the specific disclosures, but may be modified and embodied in various other forms without departing from its spirit. In short, the invention includes all the modifications and embodiments coming within the scope of the following claims.

Having thus fully described the invention, what is claimed as new and for which it is desired to secure Letters Patent, is:

1. In a grass shear, a pair of superimposed blades pivotally connected together at their rear ends, a pair of blade-actuating handles operable in a plane substantially at right-angles to the plane of said blades, the pivot pin which connects said blades being rigidly secured to the lower blade and passing upwardly through and loosely fitted in the upper blade, means for operatively connecting the lower handle to the upper part of said pivot pin, the upper handle being channel-shaped and having a pair of flat horizontal feet loosely and slidably secured to said blades respectively, one on each side of said pivot pin, and means for rigidly connecting said feet together whereby said feet will not be spread apart during normal closing of said shears.

2. In a grass shears, a pair of spring-pressed superposed blades swingable in a plane, said blades being pivotally connected together by a spindle located at right-angles thereto, a pair of pivotally connected blade actuating handles swingable in a plane at right-angles to the plane of said blades, one of said handles being channel-shaped and embracing the other, said inner handle having a loose engagement with said spindle to slide it rearwardly to close the blades when said handles are pressed together, said outer handle having a pair of flat feet members connected to said blades by a pair of pivot pins, and a flat U-shaped reinforcing plate secured to the sides of said channel-shaped handle and embracing said spindle to brace said channel-shaped handle from laterally spreading during normal operation of said shears.

3. In a grass shears, a pair of pivotally connected superposed blades operable in a substantially horizontal plane, a pair of pivotally connected blade-actuating nested handles operable in a substantially vertical plane, spring means to urge said blades and handles into open position, a pivot spindle fixedly secured to the lowermost of said blades and pivotally mounted in the upper blade, a collar on said spindle for holding said blades in close contact with each other, the lowermost of said handles operatively engaging the upper part of said spindle, the outer handle having a pair of spaced apart substantially horizontal feet pivotally connected to the rear of said blades, said feet being rigidly tied together by means above said blades to prevent them from laterally spreading apart during normal closing of said shears, said upper blade having a transverse elongated slot surrounding said pivot spindle.

4. In a grass shears, a pair of superimposed blades connected together at their rear ends by a pivot pin, a pair of superimposed blade actuating handles operable in a plane at right-angles to the planes of said blades, said pivot pin being rigidly secured to the bottom blade and passing loosely through the upper blade, the upper of said handles being channel-shaped and having a downturned substantially vertical front end which is closed to embrace the interior operating parts, said upper handle also having a pair of flat side horizontal feet below said closed end and pivotally connected to said blades, said feet pivots being held rigid and prevented from lateral spreading during the closing of said shears by the closed forward end of said upper handle.

5. In a grass shears, a pair of superimposed blades connected together at their rear ends by a pivot pin, a pair of superimposed blade actuating handles operable in a plane at right-angles to the planes of said blades, said pivot pin being rigidly secured to the bottom blade and passing loosely through the upper blade, the upper of said handles being channel-shaped and having a downturned substantially vertical front end which is closed to embrace the interior operating parts, said upper handle also having a pair of flat side horizontal feet below said closed end and pivotally connected to said blades.

6. In a grass shears, a pair of superimposed blades connected together at their rear ends by a pivot pin, a pair of superimposed blade actuating handles operable in a plane at right-angles to the planes of said blades, said pivot pin being rigidly secured to the bottom blade and passing through the upper blade, the upper of said handles being channel-shaped and having a downturned substantially vertical front end which is closed to embrace the interior operating parts, said upper handle also having a pair of flat side horizontal feet below said closed end and pivotally and loosely connected to said blades, said feet pivots being held rigid and prevented from lateral spreading during the closing of said shears by the closed forward end of said upper handle.

JUSTIN L. SMITH.